United States Patent [19]

Hanle et al.

[11] Patent Number: 5,054,055

[45] Date of Patent: Oct. 1, 1991

[54] TELEPHONE SYSTEM AND METHOD FOR THE INTELLIGENT USE OF INDIVIDUAL CALLING LINE IDENTIFICATION INFORMATION

[75] Inventors: John P. Hanle, Silver Spring, Md.; James E. Curry, Herndon, Va.

[73] Assignee: Bell Atlantic Network Services, Inc., Arlington, Va.

[21] Appl. No.: 515,027

[22] Filed: Apr. 26, 1990

[51] Int. Cl.⁵ .................. H04M 11/00; H04M 1/21; H04M 1/57

[52] U.S. Cl. ............................... 379/142; 379/96; 379/376

[58] Field of Search ............... 379/142, 48, 93, 96, 379/98, 376

[56] References Cited

U.S. PATENT DOCUMENTS 3,787,626  1/1974  Subieta .
4,071,699  1/1978  Jovic et al. .
4,242,539  12/1980  Hashimoto .
4,289,931  9/1981  Baker .
4,582,956  4/1986  Doughty ........................ 379/94
4,599,493  7/1986  Cave .
4,776,005  10/1988  Petriccione et al. .

*Primary Examiner*—Stafford D. Schreyer
*Attorney, Agent, or Firm*—Lowe, Price, LeBlanc and Becker

[57] ABSTRACT

A method and system is disclosed for interfacing Individual Calling Line Identification (ICLID) information in a telephone system with a computer at a subscriber telephone location. The data component of the received multiplexed ringing signal is extracted and stored in the internal memory of the computer. The ICLID data can be instantly displayed on the computer monitor or processed by the computer to generate related information which may be displayed on the computer monitor. The ICLID number can be transferred to the keyboard buffer to actuate a program to generate a disk lookup and populate fields on the monitor screen whereby the phone call is used drive the application by the ICLID data.

18 Claims, 3 Drawing Sheets

TELEPHONE SYSTEM AND METHOD FOR THE INTELLIGENT USE OF INDIVIDUAL CALLING LINE IDENTIFICATION INFORMATION

TECHNICAL FIELD

The present invention relates to the intelligent use of Individual Calling Line Identification (ICLID) information in a telephone system, and more particularly, to a method and system for interfacing such information with a computer at a subscriber telephone location.

BACKGROUND ART

Individual Calling Line Identification (ICLID) is a telephone on-hook capability that provides a called party with information about the caller before the incoming call is answered. Information can include the date and time of the call and caller telephone extension number. A data message, preceded by a channel seizure signal, is sent in conjunction with the ringing signal from the central office to the called party during the silent interval after the first 20-Hz, 2-second ringing phase.

ICLID service is designed for use with the voice portion of existing loop connections. The digitally formatted message is transmitted through a stream of data bits of standardized digital format. The message is sent once, without retransmission capability. The channel seizure signal, sent at the beginning of each message to alert the called party equipment of the coming information through physical connection of an appropriate interface, is typically composed of thirty continuous bytes of octal 125 (i.e., 01010101), or 250 milliseconds of a 600-Hz square wave. Transmission of data follows thereafter and is completed prior to the next 20-Hz ringing signal. For a detailed description of the method and apparatus for sending the data message, reference is made to U.S. Pat. No. 4,551,581 issued to Doughty on Nov. 5, 1985.

The ICLID "special service" feature has conventionally been used to display the message information, sent during the silent interval between the first two rings, at a dedicated alpha-numeric display at a selected subscriber station. The display may be of the LED or LCD variety. The called party can view the actual ICLID data on display before answering the telephone and the display can remain until cleared. The details of such usage are described in U.S. Pat. No. 4,582,956 issued to Doughty on Apr. 15, 1986.

The prior art limited use of reproducing ICLID information on a called party's local display has not reached full development of the capabilities of the ICLID service. While incoming information is processed and held for display, this operation is only a temporary function which is interrupted by the next incoming call or when cleared. There is no meaningful permanent storage of the ICLID information. While the existing systems may provide temporary storage of incoming ICLID information for later recall and redial by the subscriber who has been away from the telephone, a relatively small number of incoming calls will exceed the limited memory capability provided.

The ICLID information service in the prior art has not been implemented to provide the user with other relevant information concerning the calling party. Conventionally, only the limited ICLID information itself is displayed. With the now commonplace integration of the personal computer in the telephone environment, an interactive exchange between the ICLID service and related information available through the computer would overcome a shortcoming of the prior art ICLID service. For example, in a business setting, there is often the need for the called party to instantly recall previously stored related information about the calling party upon receipt of the telephone call.

DISCLOSURE OF THE INVENTION

Accordingly, one object of the invention is to provide the intelligent use of ICLID information through interaction of the transmitted signal on the local loop with a personal computer at the subscriber's station.

Another object of the invention is to provide an ICLID system interactive with a personal computer at the subscriber's station so that the interaction between the ICLID service and the computer is transparent to the user and the computer is not dedicated solely to ICLID use.

A further object of the invention is to enable a personal computer, interactive with the ICLID service at the subscriber station, to superimpose a display of incoming ICLID message information over the existing display on the computer monitor.

An additional object of the invention is to enable a personal computer, interactive with the ICLID service at the subscriber station, to permanently store a log of ICLID information transmitted with incoming calls over a desired time period, the information thereby available for future processing.

Yet another object of the invention is to enable a personal computer at the subscriber station to respond to an incoming ICLID message to generate prescribed information related to the calling party for display on the computer monitor as the incoming telephone call is received.

An additional object of the invention is to provide a personal computer, interactive with the ICLID service at a subscriber station, for displaying incoming ICLID information or information generated in response to an incoming ICLID message and being available thereafter for general operation at the control of the user.

The above and other objects of the invention are satisfied in part by providing at the subscriber station a computer for receiving the ringing signal at an input port and controlling the computer in response to the ringing signal. The data component of the ringing signal is extracted and stored in the internal memory of the computer for display or further processing.

In a preferred version of the invention, an appropriate interface is provided between the ICLID line and the personal computer at the subscriber station and includes a modem, Universal Asynchronous Receiver Transmitter (UART), and interrupt controller. The system is initialized by setting serial interface parameters and assuming interrupt control of PC components in response to system code. Compatibility is established between the UART and the modem whereby the incoming link digital transmission speed, the number of start/stop bits associated with each incoming data character, the number of data bits associated with each character, and the parity of incoming characters are set. Pointers to specific code segments in the system are implanted using variable tables made available by the computer operating system.

Additional objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
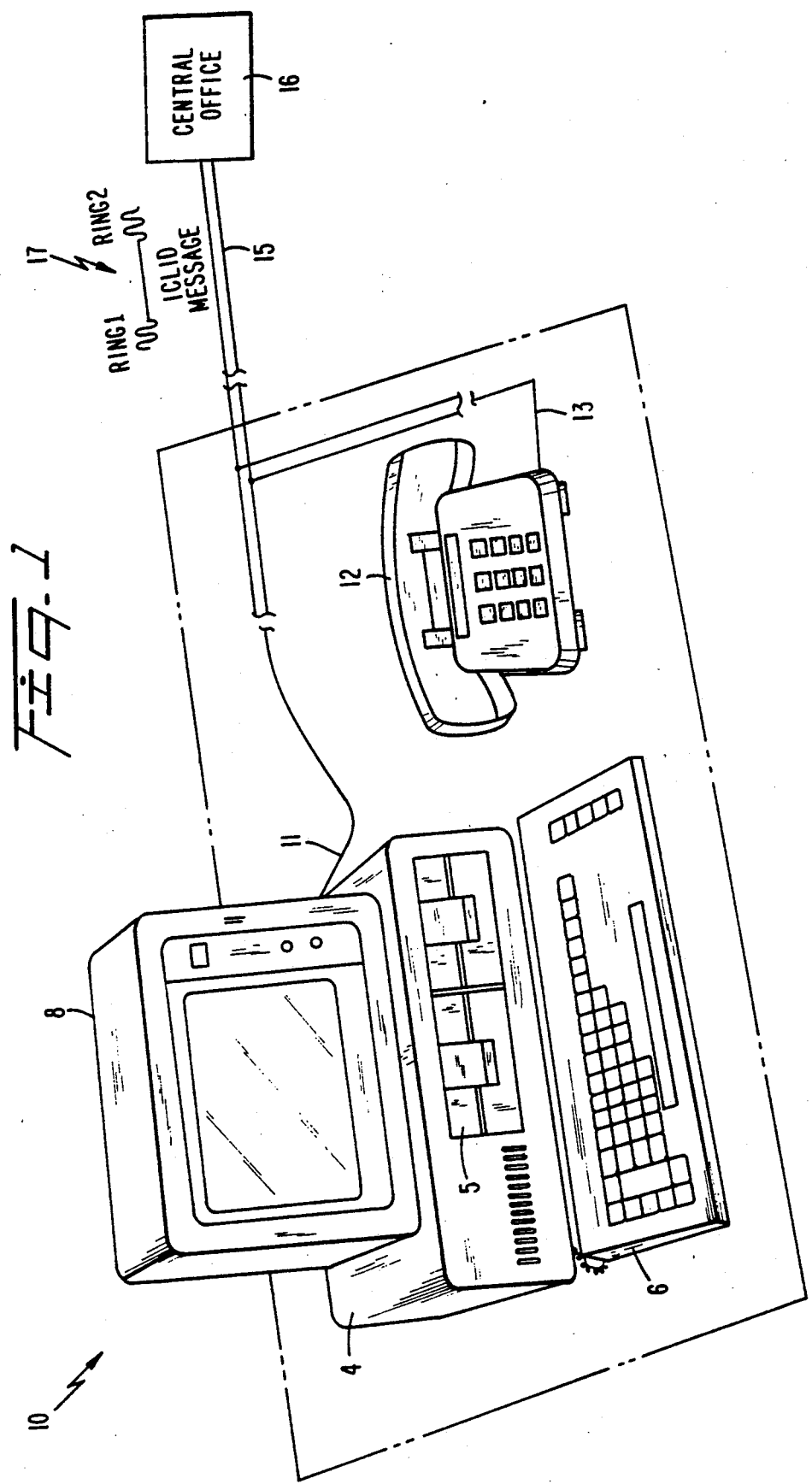
FIG. 1 is a perspective view of the subscriber station, according to the invention, illustrating the interconnection between the telephone, personal computer and incoming lines from which the ICLID is provided at the local loop.

FIG. 1 is a physical representation of the subscriber station 10, including the telephone 12 and the computer, as well as their interconnections with local loop lines 15 and the central office 16. In particular, the computer circuitry is housed in a chassis 4 including disk drives 5. The computer further comprises a keyboard 6 and a display monitor 8. Additional peripheral devices, such as a printer, may be provided but are not shown for purposes of illustration.

The computer and telephone are each connected to the local loop 15 by respective connecting lines 11 and 13, shown symbolically. With the telephone in the on-hook condition, the incoming ringing signal, having a waveform shown at 17, is applied to both the telephone and a serial input port of the computer. The ICLID message information is carried between the first and second ring signals shown in the waveform. While the phone is still on-hook the computer can process the ICLID data in a manner predetermined by the user.

When the receiver of telephone 12 is taken off-hook to complete the connection for the incoming call, the computer monitor screen can already bear a display of the ICLID information or other computer generated information responsive to the ICLID message. For example, in response to the ICLID signal the computer may initiate a data base program to provide previously stored information related to the calling party in a manner pre-established by the subscriber. Provision can be made to suspend any program operation performed by the computer at the time of the incoming call, and to superimpose the ICLID related data on the monitor. The user can, at his option, subsequently restore operation of the suspended program.

The above described computer operations function independently of whether or not the receiver is subsequently taken off-hook. The user thus has the option of determining whether to complete the incoming call on the basis of the information displayed. In addition, whether or not the call is completed, provision can be made to permanently store ICLID information to disk for archival purposes or for further processing at a later time.

Figure 2:
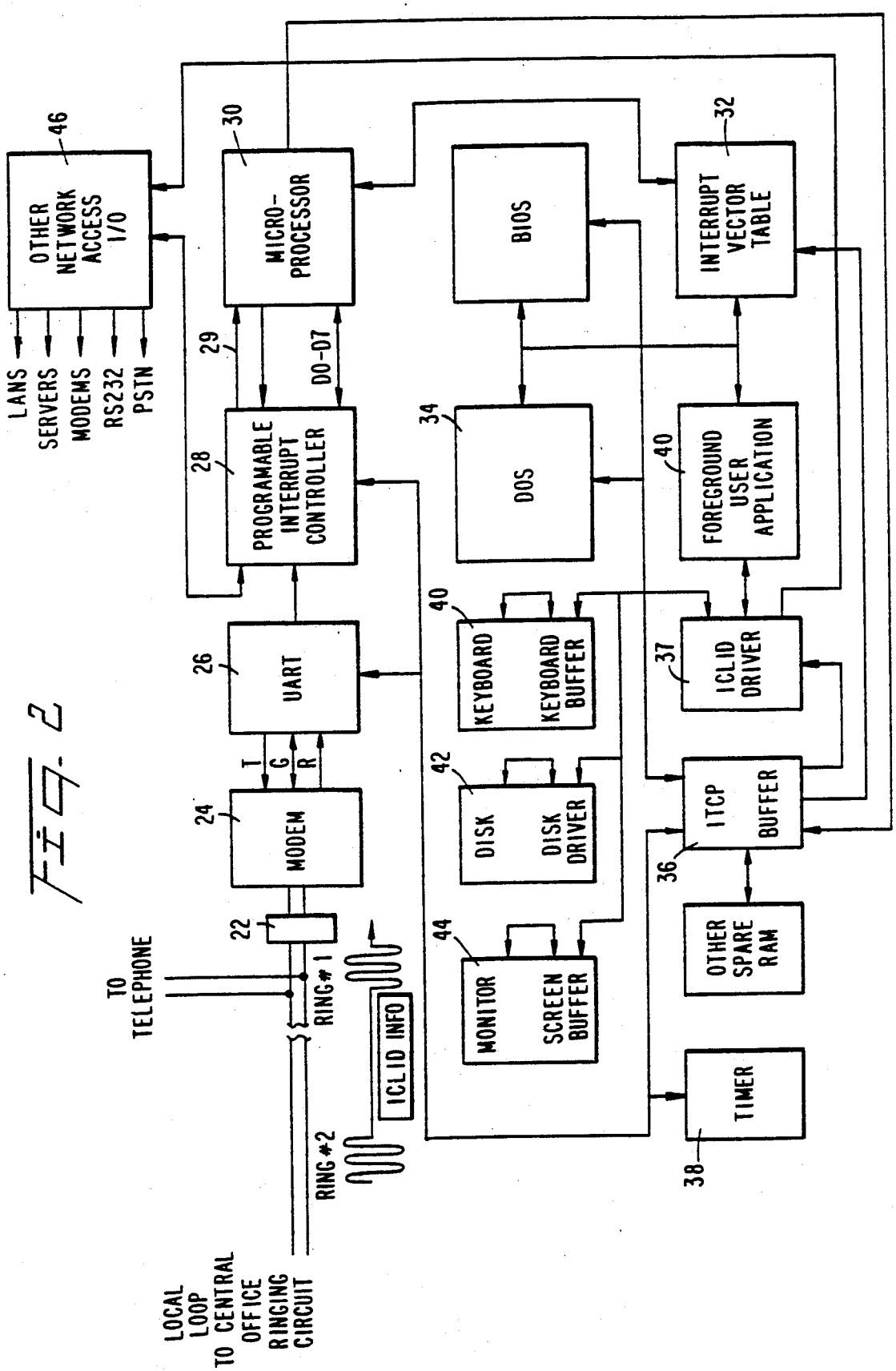
FIG. 2 is a block diagram representing interface circuitry as well as internal computer elements at the subscriber station.

FIG. 2 is a block diagram showing the elements and functions of the system computer and interface. The incoming ICLID line is connected to modem 24 through a serial input port and capacitive isolator 22. The modem is selected to be compatible with the ICLID signal sent from the central office. The modem may be a well known 202 format modem which is readily available, although not the 212 format modem typically provided with personal computers. The 202 modem is a 1200 bit per second modem usually used for private lining. Preferably, a self-contained interface that performs a conversion from 202 format to 212 format is provided.

The modem is connected by means of the T, G and R (transmit, ground and receive) lines to the Universal Asynchronous Receiver Transmitter (UART) 26. The UART is a discrete integrated circuit, such as a readily available version known as an 8250, which senses the lines. After recognition of the channel seizure signal, sent at the beginning of the ICLID message, the UART stores in an internal buffer all the bits for the first character of the message. At this point it generates an interrupt request to the computer system to start the ICLID responsive process.

The interrupt is fed to programmable interrupt controller (PIC) 28. The PIC is a discrete integrated circuit, such as the commonly known 8259, used to control multiple interrupts in response to interrupt requests at different levels of priority within the system. The incoming ICLID signal from a serial input port generates a mid level interrupt. Highest level interrupts are reserved for internal computer functions such as, for example, clock signals.

The PIC 28 is connected to the computer microprocessor 30 through a plurality of lines 29. The PIC communicates to the microprocessor an interrupt request and, in response to a return request acknowledgement and level query by the microprocessor, sends the level of the interrupt.

The microprocessor then accesses the interrupt vector table 32 in the internal memory of the computer. The vector table is assigned under the control of the disk operating system, DOS 34. The interrupt number is indexed in the table to find an address pointer which identifies code to be executed. This code has been established, upon initialization by the user, at memory segment locations in block 36 which services interrupt requests.

The microprocessor then begins code execution of the ICLID telephone number collect program (ITCP). The ITCP queries the UART buffer for the character received and stores it in its own internal buffer waiting for either the next character or the last character transmitted during the ICLID transmission sequence. Following the receipt of each character, the PIC is reenabled to allow reception of the next character of the UART to signal a processing request to the microprocessor.

At the end of the ICLID message stream is a block check character (BCC). After the ITCP has received the BCC, a check of the collected characters stored in the ITCP storage buffer is made. If verification fails, the ITCP storage buffer is cleared and the ITCP is reinitialized for the next incoming ICLID sequence. Timer 38 is provided to assure clearance if the BCC is not received within a predetermined time period after the start of the ICLID stream.

If verification of the message is achieved the ICLID driver 37 is enabled to execute code using the collected ICLID information in the ITCP buffer. The ICLID driver will function in accordance with instructions set during initialization of the process by the user. The ICLID driver can make the collected ICLID information available to one or a variety of PC resources.

In the event that the user has designated keyboard insertion as the receptor of the ICLID stream, the ICLID driver will locate the internal keyboard buffer 40 and will insert therein the stored ICLID stream, as well as any other user provided data. Normal DOS/BIOS operating system or applications program functions deload the keyboard buffer and provide any foreground user applications 40 with the ICLID and user provided data stream.

In the event that the user has designated disk storage as the receptor of the ICLID data stream, the ICLID driver checks standard internal PC system registers and processes to see if it can perform non destructive reads and writes to the floppy or hard disk drives 42. If the system checks indicate that a safe environment exists, the ICLID Driver utilizes standard DOS/BIOS function calls to open a user pre-defined file and write the ICLID stream, as well as any user pre-defined information, to the disk. If a safe system does not exist, the event is queued for later execution.

In the event that the user has designated the monitor 44 as the receptor of the ICLID data stream, the ICLID driver first determines the type of screen display hardware being used in the PC, saves the present user screen contents in a RAM buffer, and then displays the ICLID stream, as well as any user information on the monitor screen. The ICLID driver then goes into a wait loop whereby depression of user pre-defined key sequences are monitored. Upon occurrence of these sequences, the ICLID Driver removes the ICLID information from the monitor and returns the screen to its appearance prior to receipt of the ICLID information.

The ICLID data stream may also be made available by the ICLID driver to units and interfaces outside of the host PC by Other Network Access I/O ports 46. The ICLID driver interfaces with these ports according to their on-board protocols. The system can thereby be used to determine historical information of the incoming party and thereafter drive external components such as voice prompters, DTMF receivers, printers, plotters and servers.

Figure 3:
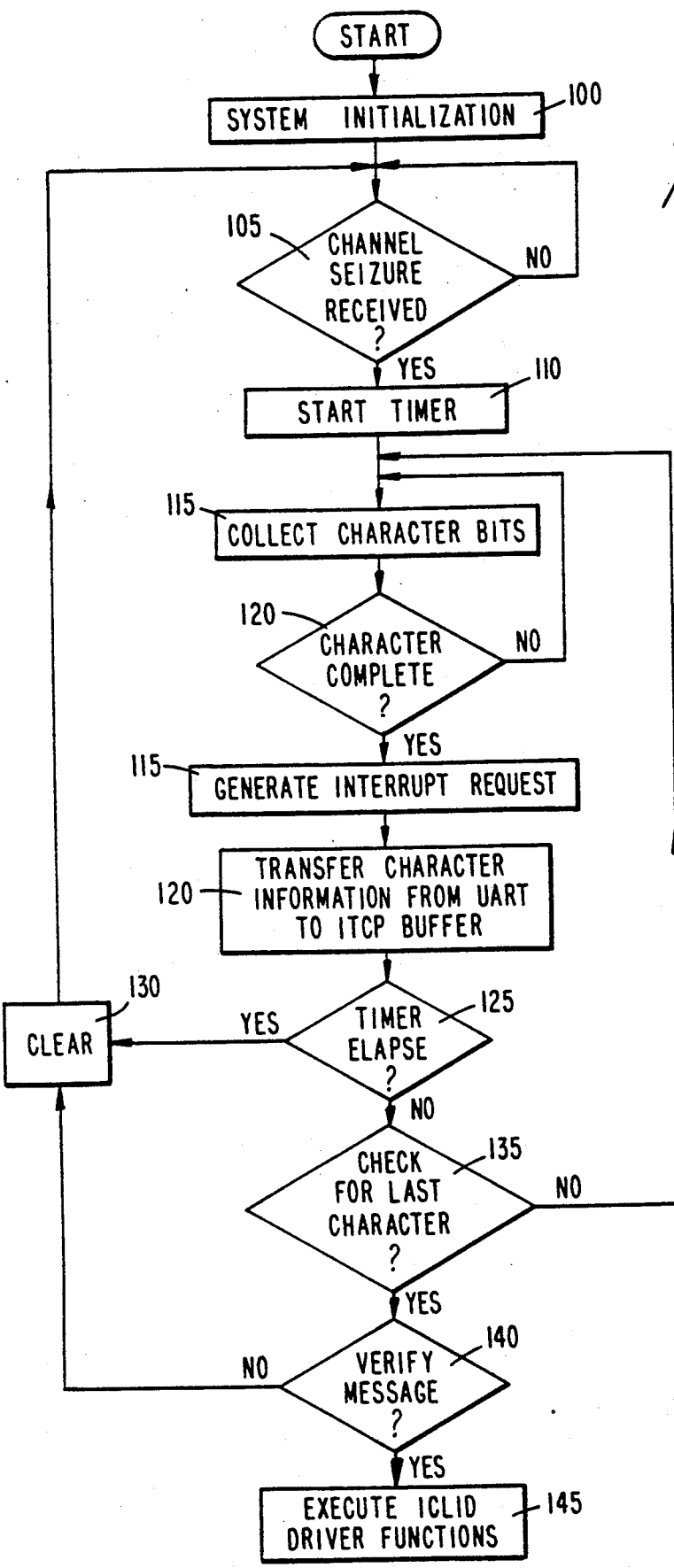
FIG. 3 is a flow chart illustrating the programming functions of the system.

Operation of the system is described with reference to the flow chart shown in FIG. 3. In the system initialization (block 100) a sequence is performed including executing software code, setting serial interface parameters and assuming interrupt control of PC components. The UART is made compatible with the connected modem. Specific internal UART characteristics include the incoming data character, the number of data bits associated with each character and the parity of incoming characters. Pointers to specific code segments are then implanted into the interrupt vector table through DOS/BIOS operating system calls. These pointers enable subsequent interrupt requests generated by the PIC to control the ITCP and ICLID driver. Following the insertion of interrupt pointers, the system clears the service request register of the PIC to enable subsequent interrupt request activations to be processed by the microprocessor.

Initialization of the ICLID driver is dependent upon the user's specific ses. For example, if it is the user's intention to run a data base program, the driver may be initialized merely to put the calling party's telephone number into the keyboard buffer to appear in a telephone number field of a data base application file on the monitor screen. In a more sophisticated application, transferring the ICLID number to the keyboard buffer could actuate the program to generate a disk lookup and populate the rest of the fields on the monitor screen so that the phone call will basically drive the application.

If the user merely wants the incoming telephone number displayed on the screen while the computer is executing any program, the driver may be initialized to transmit the ICLID number to the monitor screen buffer. The output choices available to the user include the monitor and disk storage to keep a caller log to which time or keyboard insertion can be appended.

An additional option is to superimpose ICLID related information on the screen foreground during the display of a user application program in execution. That is, the user can choose initially to have the telephone number of an incoming call to "pop up" on the screen during the operation of application software. For example, a word processing program may be in use with a document displayed on the monitor screen. The ICLID driver could have been initialized to interrupt the user's application in response to an ICLID message, read the screen buffer and store information to be overriden and replaced on a portion of the display with the telephone number of the calling party. The interrupted computer application operation would then be frozen, with the application restarted in response to a preselected key sequence input by the user, such as the escape key. In response to such key sequence, the telephone number would be replaced by the stored information and the application would be restarted, so that the display returns to its former appearance.

It is evident from the above examples that the initialization process affords the user a wide range of options for determining in advance how ICLID information received with an incoming call will be used. Each initialization process can be customized for a distinct applicational purpose or the process can be programmed to be set in a particular manner with each use until changed.

Returning to FIG. 3, after system initialization, the system (block 105) continually checks for the channel seizure signal which indicates an incoming ICLID message. Upon receipt of the channel seizure signal, the timer is started (block 110) and the UART stores incoming character bits (block 115). A check is made (block 120) to determine whether character information is complete. If the information for a character is complete, an interrupt request is generated by the UART (block 115).

In response to the UART interrupt request, the character information stored in the UART buffer is transferred to the ITCP buffer (block 120) in the manner described above with respect to FIG. 2. That is, the PIC communicates with the microprocessor to transmit the interrupt level whereby the interrupt vector table establishes execution of the ITCP program.

The timer is checked (block 125) to determine whether the preset time period has elapsed. A positive determination would indicate that the complete message has not been received and the ITCP buffer and the UART buffer are cleared (block 130). Operation then returns to the post system initialization step 105. If the time period has not yet elapsed, a check is made of the ICLID message for the BCC character, indicative of the last character of the message. If the last character has not been found, operation returns to block 115 to collect additional character bit information.

If the last message character has been recognized, a message verification routine is undertaken (block 140) whereby a check of the buffered characters is performed against the received BCC in a known manner. If the verification fails the storage buffers are cleared (block 130) and the system is prepared for the next incoming ICLID sequence at block 105. If verification passes, the ICLID collection process is complete and the ICLID driver functions in accordance with the preset initialization previously described (block 145).

As will be appreciated from the above description, a wide range of generic applications is available with the system of the invention. As one example, the system may be used advantageously for interacting with business order entry applications that are accessible based on a telephone number "key." The host PC at the telephone subscriber station would be dedicated to running an ordering application and would be awaiting keyboard input of the telephone number of a patron originating an order request via the telephone. After the first power ringing cycle to the PC, the system would collect the originating party's telephone number and proceed to insert the calling party information into the keyboard buffer, simulating typing by a human operator.

Upon receiving the originating telephone number, the application would query its database files and determine whether the calling party has made prior orders. If the database indicates the existence of prior orders, a screen listing, via pop-up, of the historical ordering nature of the patron, including name, etc., would be presented to the salesperson viewing the monitor screen, thereby providing a more personalized service. The salesperson could then review the screen information and determine the appropriate requests to be made to the patron during the phone conversation. The system would decrease the amount of time necessary for the salesperson to interact with the calling patron. Necessary factual information about the patron is already made available to the salesperson by the system.

Taking the example further, the system provides the ability to totally automate an entire entry application. Having determined the patron's ordering history, the system can feed a voice synthesizer with appropriate information to query the patron as to what is to be ordered. Following the query, the system can await DTMF or voice recognition responses by the patron to determine the exact nature of the order. Upon receiving the entire order, the system can instruct the voice synthesizer to inform the patron of the status of the order and complete the conversation. The system can then take the received ordering information and retrieve and printout pertinent graphical information depicting the location of the customer. The patron's order can be prepared and routed for filling, either through a directly connected printer (through an RS232) or LAN (e.g., Ethernet). The order can be accounted for, in response to input from the computer, in the business accounting system.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein.

What is claimed is:

1. A telephone system including a central office and a remote local subscriber station interconnected by a local loop, said telephone system comprising
   means at said central office for generating a multiplexed ringing signal having a ringing component and a data component;
   means at said subscriber station for receiving said ringing signal, said subscriber station further comprising
   a computer including a central processing unit, internal memory, permanent storage, and a keyboard;
   means for inputting said ringing signal to an input port of said computer;
   control means for controlling said computer in response to said ringing signal, said control means comprising
   extracting means for extracting the data component of the received multiplexed ringing signal; and
   means for storing the extracted data in the internal memory of the computer; said subscriber station further comprising
   means for displaying on a monitor information corresponding to said extracted data; wherein
   the data component of the ringing signal represents caller line identification intelligence and said control means further comprises
   means for applying said extracted data to a keyboard buffer memory in said computer.

2. A telephone system according to claim 1 further comprising
   means responsive to said extracting means for suspending performance of a program being processed by said computer and to freeze the display on said monitor, and
   means responsive to said extracting means for accessing said information and to superimpose said information on the monitor display.

3. A telephone system according to claim 2 further comprising means responsive to an input from the keyboard to replace the superimposed monitor display with the information from the originally frozen display and resume operation of said program.

4. A telephone system according to claim 1 further comprising timer means for clearing the extracted data from the internal memory at a predetermined time after receipt of said data signal.

5. A telephone system including a central office and a remote local subscriber station interconnected by a local loop, said telephone system comprising
   means at said central office for generating a multiplexed ringing signal having a ringing component and a data component;
   means at said subscriber station for receiving said ringing signal, said subscriber station further comprising
   a computer including a central processing unit, internal memory, permanent storage, and a keyboard;
   means for inputting said ringing signal to an input port of said computer;
   control means for controlling said computer in response to said ringing signal, said control means comprising
   extracting means for extracting the data component of the received multiplexed ringing signal; and means for storing the extracted data in the internal memory of the computer;

said subscriber station further comprising means for transferring said extracted data to the computer permanent storage.

6. In a telephone system, a local station coupled to a central office through a local loop, said local station comprising:

receiving means for receiving a multiplexed calling signal having a ringing component and a data component, wherein said data component represents caller line identification intelligence;

a computer including a microprocessor, internal memory, and a keyboard;

extracting means for extracting said data component;

control means for controlling said computer in response to said extracting means;

said control means comprising means for inputting said calling signal to an input port of said computer;

storing means for storing information represented in said extracted data in digital form in said internal memory; and means for displaying said information;

wherein said control means further comprises means for transmitting said digital information to a keyboard buffer memory in said computer;

means responsive to said extracting means to suspend performance of a program in operation by said computer and to freeze the display on a monitor; and means responsive to said extracting means for accessing said keyboard buffer memory and to superimpose said information on the monitor display.

7. A telephone system as claimed in claim 6, wherein said control means further comprises:

means responsive to an input from the keyboard to terminate said superimposed display and resume operation of said program.

8. A telephone system according to claim 7 further comprising timer means for clearing the extracted data from the internal memory a predetermined time after receipt of said data signal.

9. In a telephone system, a local station coupled to a central office through a local loop, said local station comprising:

receiving means for receiving a multiplexed calling signal having a ringing component and a data component, wherein said data component represents caller line identification intelligence;

a computer including a microprocessor, internal memory, and a keyboard;

extracting means for extracting said data component;

control means for controlling said computer in response to said extracting means;

said control means comprising means for inputting said calling signal to an input port of said computer;

storing means for storing information represented in said extracted data in digital form in said internal memory; and means for displaying said information and means for transferring said extracted data to the computer permanent storage.

10. In a telephone system including a subscriber station connected to a local loop, the subscriber station including a computer having a central processing unit, an internal memory, a permanent storage, and a ke board, a method for providing caller line identification intelligence comprising the steps of receiving a multiplexed ringing signal having a ringing component and a data component, said data component representing caller line identification intelligence;

extracting the data component of the received multiplexed ringing signal;

storing the extracted data in the internal memory of the computer;

displaying information corresponding to said extracted data; and applying said extracted data to a keyboard buffer memory in said computer.

11. In a telephone system including a subscriber station connected to a local loop, the subscriber station including a computer having a central processing unit, an internal memory, a permanent storage, and a keyboard, a method for providing caller line identification intelligence comprising the steps of receiving a multiplexed ringing signal having a ringing component and a data component, said data component representing caller line identification intelligence;

extracting the data component of the received multiplexed ringing signal;

storing the extracted data in the internal memory of the computer;

displaying information corresponding to said extracted data; and in response to receipt of the ringing signal, the steps of suspending performance of a program being processed by said computer; and freezing the display on a monitor; and wherein said displaying step further comprises accessing said extracted data; and superimposing said extracted data on the monitor display.

12. A method according to claim 11 further comprising the steps of replacing the superimposed monitor display with the information from the originally frozen display in response to an input from the keyboard and thereafter resuming operation of said program.

13. In a telephone system including a subscriber station connected to a local loop, the subscriber station including a computer having a central processing unit, an internal memory, a permanent storage, and a keyboard, a method for providing caller line identification intelligence comprising the steps of receiving a multiplexed ringing signal having a ringing component and a data component, said data component representing caller line identification intelligence;

extracting the data component of the received multiplexed ringing signal;

storing the extracted data in the internal memory of the computer;

displaying information corresponding to said extracted data; and generating additional information related to said extracted data; said displaying step further comprising displaying said additional related information on the monitor display.

14. In a telephone system including a subscriber station connected to a local loop, the subscriber station including a computer having a central processing unit, an internal memory, a permanent storage, and a keyboard, a method for providing caller line identification intelligence comprising the steps of
- receiving a multiplexed ringing signal having a ringing component and a data component, said data component representing caller line identification intelligence;
- extracting the data component of the received multiplexed ringing signal;
- storing the extracted data in the internal memory of the computer;
- displaying information corresponding to said extracted data; and
- clearing the extracted data from the internal memory a predetermined time after receipt of said data signal.

15. In a telephone system including a subscriber station connected to a local loop, the subscriber station including a computer having a central processing unit, an internal memory, a permanent storage, and a keyboard, a method for providing caller line identification intelligence comprising the steps of
- receiving a multiplexed ringing signal having a ringing component and a data component, said data component representing caller line identification intelligence;
- extracting the data component of the received multiplexed ringing signal;
- storing the extracted data in the internal memory of the computer; and
- displaying information corresponding to said extracted data; and
- storing said extracted data in the computer permanent storage.

16. In a telephone system, a local station coupled to a central office through a local loop, said local station comprising:
- means for receiving a multiplexed calling signal having a ringing component and a data component, wherein said data component represents caller line identification intelligence; and
- a computer including a microprocessor, internal memory, and a keyboard, said computer programmed to carry out the operations of
- extracting said data component of the ringing signal;
- storing information representing said extracted component in digital form in said internal memory; and
- displaying said information;
- and wherein said computer is further programmed to perform operations, in response to receiving the calling signal, comprising
- suspending performance of a program being processed;
- freezing the display on a monitor; and
- superimposing said information on the monitor display.

17. In a telephone system, a local station coupled to a central office through a local loop, said local station comprising:
- means for receiving a multiplexed calling signal having a ringing component and a data component, wherein said data component represents caller line identification intelligence; and
- a computer including a microprocessor, internal memory, and a keyboard, said computer programmed to carry out the operations of
- extracting said data component of the ringing signal;
- storing information representing said extracted component in digital form in said internal memory; and
- displaying said information;
- and wherein said computer is further programmed to perform operations, in response to receiving the calling signal, comprising
- accessing previously stored data related to said caller line identification intelligence and displaying said related data on the monitor display.

18. In a telephone system, a local station coupled to a central office through a local loop, said local station comprising:
- means for receiving a multiplexed calling signal having a ringing component and a data component, wherein said data component represents caller line identification intelligence; and
- a computer including a microprocessor, internal memory, and a keyboard, said computer programmed to carry out the operations of
- extracting said data component of the ringing signal;
- storing information representing said extracted component in digital form in said internal memory; and
- displaying said information;
- and further comprising a modem, a universal asynchronous receiver transmitter and an interrupt controller and wherein said data component of the calling signal comprises a number of data bits associated with each character of caller line identification intelligence, said computer being further programmed to perform initialization operations comprising
- setting serial interface parameters;
- assuming interrupt control of PC components in response to system code; and
- setting pointers to specific code segments in the system; whereby
- compatibility is established between the universal asynchronous receiver transmitter and the modem to set the incoming link digital transmission speed, the number of start/stop bits associated with each incoming data character, the number of data bits associated with each character, and the parity of incoming characters.

* * * * *